United States Patent [19]
Stansfield

[11] Patent Number: 4,843,379
[45] Date of Patent: Jun. 27, 1989

[54] COLOR DISPLAYS
[75] Inventor: Peter W. Stansfield, Herts, England
[73] Assignee: Crosfield Electronics (USA) Limited, England
[21] Appl. No.: 879,740
[22] Filed: Jun. 27, 1986
[30] Foreign Application Priority Data
  Jun. 27, 1985 [GB] United Kingdom ................. 8516232
[51] Int. Cl.⁴ ............................................. G03F 3/08
[52] U.S. Cl. ..................................... 340/701; 340/703; 358/80
[58] Field of Search ....................... 340/703, 702, 701; 358/80; 364/526

[56] References Cited
U.S. PATENT DOCUMENTS

| | | | |
|---|---|---|---|
| 2,902,539 | 9/1959 | Shapiro | 358/80 |
| 3,689,689 | 9/1972 | Weitzsch | 358/30 |
| 4,183,046 | 1/1980 | Dalke et al. | 340/703 |
| 4,511,989 | 4/1985 | Sakamoto | 358/80 |
| 4,573,071 | 2/1986 | Sakamoto | 358/80 |
| 4,648,051 | 3/1987 | Wandell et al. | 364/526 |
| 4,670,780 | 6/1987 | McManus et al. | 358/80 |

FOREIGN PATENT DOCUMENTS 0090596 10/1983 European Pat. Off. .
0129446 12/1984 European Pat. Off. .

Primary Examiner—Gerald L. Brigance
Assistant Examiner—Alvin Oberley
Attorney, Agent, or Firm—Sughrue, Mion, Zinn, Macpeak & Seas

[57] ABSTRACT

Image display apparatus comprises, a monitor (6); a monitor control system (4,5) connected to the monitor (6); and a color modifying circuit (2) for receiving from a store (1) first signals representing the color content of pixels of an image and for generating monitor control signals for each pixel which are fed to the monitor control system. The color modifying circuit (2) generates for any first signals representing a color which falls outside the gamut of colors normally displayable by the monitor (6), monitor control signals representing a respective equivalent color which falls within the monitor gamut, by applying a predetermined algorithm to the first signals which desaturates all the image colors while leaving hue and intensity unaffected.

6 Claims, 2 Drawing Sheets

COLOR DISPLAYS

FIELD OF THE INVENTION

The invention relates to methods and apparatus for displaying images on a monitor.

DESCRIPTION OF THE PRIOR ART

In conventional image processing systems, an opportunity is provided to an operator to view an image on a monitor for the purposes of deciding whether any modification of the colours is required prior to the generation of colour separations. A previously scanned image is stored in digital form and can be modified using for example our Studio 860 system.

Normally, the colour gamut displayable on the colour monitor is virtually the same as the gamut producable with conventional process or printing inks. In some applications, however, for example with packaging inks these can cover a much larger gamut including fluorescent inks and inks of very pure colour. These inks cannot be displayed accurately on the monitor because they are out of range of the phosphors of the monitor. It is impossible therefore to check the gradation of these pure colours.

For example, colours having intensities up to 50% of a maximum intensity will be displayed correctly but colours greater than this in intensity will be limited to the 50% intensity.

SUMMARY OF THE INVENTION

In accordance with one aspect of the present invention, we provide a method of displaying an image on a monitor in which any colour in the image which falls outside the gamut of colour normally displayable on the monitor is represented by a respective equivalent colour falling within the monitor gamut, the equivalent colour being determined by applying a predetermined algorithm to the out of gamut colour.

Although the equivalent colours which are displayed will not be the same as the colours to be printed, it is the gradations between these colours which is of most importance.

Preferably each colour in the image is represented by a respective equivalent colour falling within the monitor gamut, the equivalent colours being determined by applying the predetermined algorithm to all the image colours. This simplifies processing and enables the gradations between all colours in the image to be viewed.

The colours may be defined in any conventional manner for example as colour component densities, dot sizes or percentages, or colour vectors. Typically each image colour and each equivalent colour is defined by printing format colour components. The printing format colour components are then converted to monitor format colour components. In some cases however the colours that are modified may be defined by monitor format colour components.

The algorithm which is applied will in general be determined empirically and may be a linear function or a higher order function as appropriate.

Preferably, the algorithm reduces the saturation of colours to which it is applied. In this case it is convenient to represent the colours in terms of their saturation, hue and intensity.

In another method, the colours could be represented by tristimulus values with the algorithm reducing saturation and altering intensity (higher or lower) by changing the values of constant multipliers in the standard Neugebauer equations.

In accordance with a second aspect of the present invention, image display apparatus comprises a monitor; monitor control means connected to the monitor; and colour modifying means for receiving first signals representing the colour content of pixels of an image and for generating monitor control signals for each pixel which are fed to the monitor control means, the colour modifying means generating for any first signals representing a colour which falls outside the gamut of colours normally displayable by the monitor, monitor control signals representing a respective equivalent colour which falls within the monitor gamut, by applying a predetermined algorithm to the first signals.

It should be understood that the term "image" includes not only a complete representation of a picture of the like but also a part of such a representation.

BRIEF DESCRIPTION OF THE DRAWINGS

An example of a method and apparatus in accordance with the present invention will now be described with reference to the accompanying drawings, in which:-

DETAILED DESCRIPTION OF AN EMBODIMENT

Figure 1:
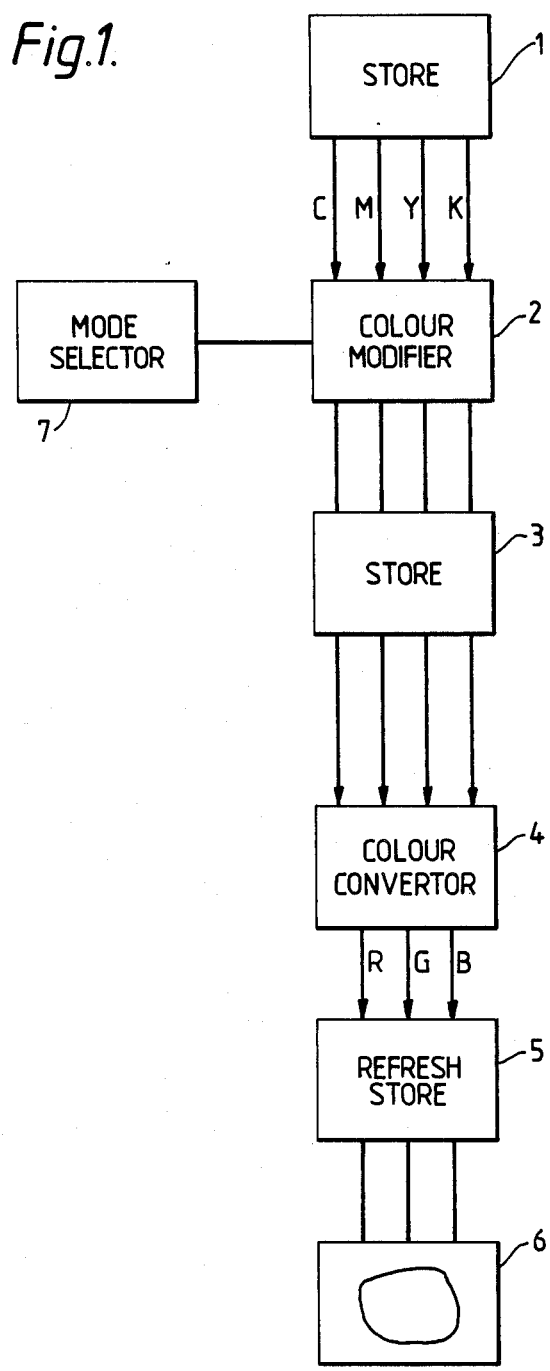
FIG. 1 is a block diagram of the apparatus.

The apparatus shown in FIG. 1 comprises a disc store 1 in which the colour component densities of a previously scanned image are stored in digital form pixel by pixel. The colour components comprise printing ink colour components such as cyan, magenta, yellow and black. The disc store 1 is connected to a colour modifier circuit 2 to be described below which in turn is connected to a second (disc) store 3. The store 3 is accessed by a colour converter circuit 4. The colour converter 4 converts the printing colour component signals into monitor format signals such as red, green, and blue which are fed via a refresh store 5 to a colour monitor 6.

A mode selector 7 is connected to the colour modifier 2 to control the mode of operation.

Although the apparatus is illustrated by separate blocks, a majority of the functions will be performed by a suitably programmed microcomputer.

Figure 2:
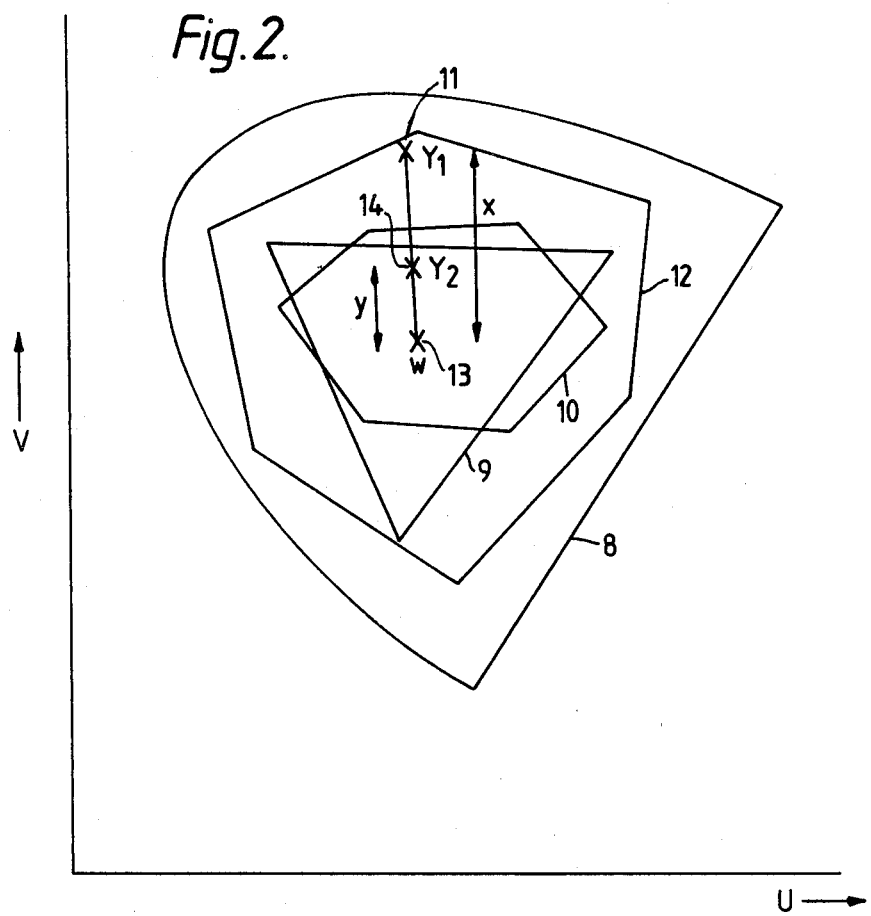
FIG. 2 is a CIE diagram illustrating how normally out of range colours are brought within the monitor gamut.

FIG. 2 is a conventional CIE diagram in which the gamut of all visible colours is defined by a spectrum locus 8. A locus 9 illustrates the gamut of colours displayable by the monitor 6 and it will be seen that this gamut is much smaller than the gamut of all visible colours. The gamut of colours possible with typical printing inks is indicated by a locus 10 and it will be seen that most of these colours fall within the monitor gamut 9 and will be correctly displayed. Certain printing colours, however, such as packaging yellow indicated by a point 11 in FIG. 2 fall outside the monitor gamut 9. This means that this colour cannot be accurately displayed by the monitor. In fact, in practice the monitor will display the most saturated colour it can within its own gamut 9 and which is nearest the point 11. The gamut of colours typically available with packing inks is indicated by a locus 12.

The white point is indicated by a point 13 in FIG. 2.

In a first mode, the mode selector 7 causes signals from the store 1 to pass unmodified to the colour converter 4 and the image is displayed on the monitor 6 with most of the colours being accurately displayed since they will fall within the monitor gamut 9. However, if certain colours fall outside the gamut 9 the operator can select with the mode selector 7 a second mode in which the data in the store 1 are accessed by the colour modifier 2. The colour modifier applies an algorithm to each colour in the accessed portion of the image as stored in the store 1, the purpose of the algorithm being to desaturate the colours. In its simplest form, as illustrated in FIG. 2, the distance between the out of range colour defined by the point 11 and the white point 13 is determined and then scaled sufficiently such that a new point 14 is determined within the gamut 9. For example, a simple case of the algorithm may have the form:

$$y = x/2$$

(where x, y are as shown in FIG. 2).

The colour modifier 2 applies this algorithm to all the values in the store 1 and these modified values or equivalent colours are fed to the store 3. The colour converter 4 then accesses the store 3 and controls the monitor 6 which displays the equivalent colours corresponding to the modified values on the monitor 6.

Clearly, the point 14 defines a colour different from the point 11. However, since the same algorithm has been applied to all the colours it is possible to see the gradations between the colours and thus to modify the original colours if desired to obtain desired gradations.

Figure 3:
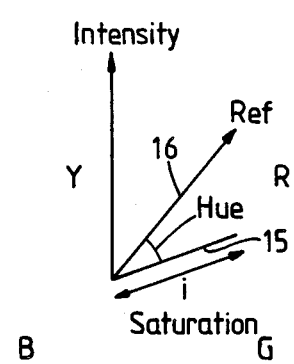
FIG. 3 illustrates a 3 dimensional polar diagram for representing colours.

The action of the algorithm on the signals from the store 1 is to convert these from printing colour component representations to equivalent representations of hue, intensity and saturation. FIG. 3 illustrates a polar representation of colours with a vertical axis representing intensity, the length of the colour vector 15 representing saturation, and the angle of the vector to a horizontal reference 16 representing hue. The colour is modified (desaturated) by reducing the length of the colour vector while maintaining the orientation of the colour vector constant. The hue, saturation, intensity representation is the converted back to equivalent printing colour component representations which are stored in the store 3.

I claim:

1. A method of displaying an image on a monitor having a gamut of colours normally displayable thereon and wherein at least one image colour lies outside said gamut, said method comprising the step of applying a predetermined algorithm to all image colours in said image so as to desaturate all said image colours, including any image colour lying outside said gamut, while leaving hue and intensity unaffected, such that any out of gamut colour is represented by a respective different equivalent colour falling within said gamut.

2. A method according to claim 1, wherein said predetermined algorithm is a linear scaling function which reduces the saturation of each of said image colours by the same factor.

3. A method according to claim 1, wherein each image colour and each equivalent colour is defined by printing format colour components.

4. Image display apparatus comprising a monitor; monitor control means connected to said monitor; and colour modifying means for receiving first signals representing the colour content of pixels of an image and for generating monitor control signals for each pixel which are fed to said monitor control means, said colour modifying means applying a predetermined algorithm to all colours in said image, such that all said image colours, including any colour in the image which falls outside of the gamut of colours is desaturated while leaving hue and intensity substantially unaffected so that the out of gamut colour is represented by a respective different equivalent colour which falls within said monitor gamut.

5. Apparatus according to claim 4, further comprising mode selection means for selecting the mode of operation of the apparatus, said mode selection means causing said first signals to pass unmodified to said monitor control means in a first mode, and to be modified by said colour modifying means in a second mode.

6. Apparatus according to claim 4, wherein the first signals represent printing format colour components.

* * * * *